United States Patent [19]

Axmann

[11] Patent Number: 4,504,918
[45] Date of Patent: Mar. 12, 1985

[54] ARRANGEMENT FOR CONTROLLING THE OPERATION OF A GRABBING CRANE FOR LOADING AND UNLOADING A SHIP

[75] Inventor: Arnold Axmann, Erlangen, Fed. Rep. of Germany

[73] Assignee: Siemens Aktiengesellschaft, Munich, Fed. Rep. of Germany

[21] Appl. No.: 356,296

[22] Filed: Mar. 10, 1982

[30] Foreign Application Priority Data

Mar. 13, 1981 [DE] Fed. Rep. of Germany ....... 3109784

[51] Int. Cl.³ .............................................. G06F 15/20
[52] U.S. Cl. .............................. 364/478; 340/286 M; 340/709; 340/725; 414/139; 414/730; 364/461; 212/153
[58] Field of Search ........................ 364/424, 478, 189; 212/149, 153; 414/139, 143, 323, 730; 340/286 M, 524, 525, 709, 725; 273/856, DIG. 28; 434/219; 901/9

[56] References Cited

FOREIGN PATENT DOCUMENTS 1082837 6/1960 Fed. Rep. of Germany .
2642181 12/1979 Fed. Rep. of Germany .

Primary Examiner—Errol A. Krass
Assistant Examiner—Edward R. Cosimano
Attorney, Agent, or Firm—Kenyon & Kenyon

[57] ABSTRACT

An arrangement for controlling movement of the grab bucket of a grabbing crane used for loading and unloading bulk material into and from ships is disclosed. Collisions of the grab bucket with the ship's superstructure and the hatch edges are avoided according to the invention by approaching the hatch edges with the grab bucket open and displaying the actual values so obtained as bars representing the horizontal position and width of the hatch on a display. To avoid collisions, the grab bucket drives are switched off if any desired value, set manually or by a marking line computer, exceeds an actual value.

8 Claims, 1 Drawing Figure

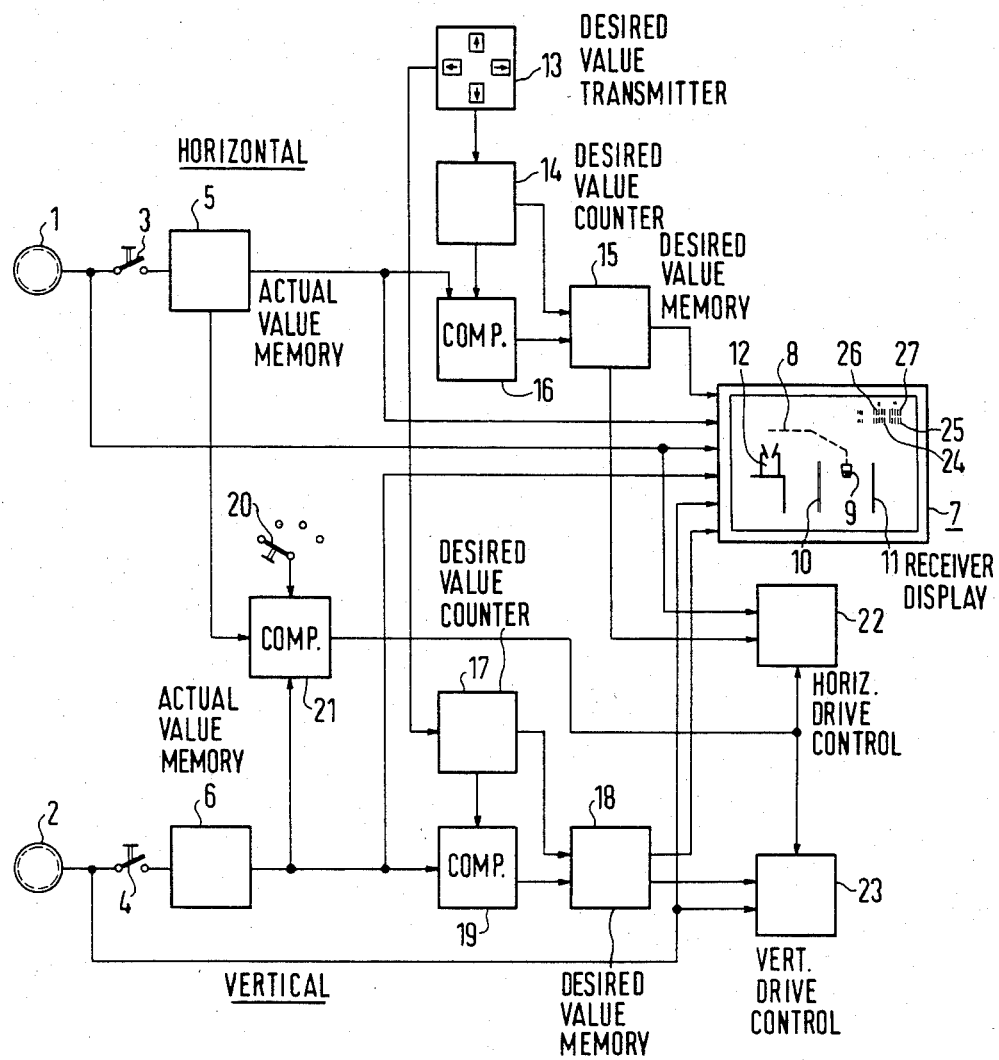

ARRANGEMENT FOR CONTROLLING THE OPERATION OF A GRABBING CRANE FOR LOADING AND UNLOADING A SHIP

BACKGROUND OF THE INVENTION

The present invention relates to a control arrangement for controlling the operation of a grabbing crane for handling bulk material, particularly a bridge grabbing crane for loading and unloading bulk material into and from a ship.

DE-AS No. 10 82 837 discloses an arrangement for controlling the operation of a grabbing crane in which the position of the grab bucket is remotely displayed by means of a television camera and a television screen. The actual position of the crane carriage within a range defined by markings on a stationary part of the crane in the field of view of the camera is displayed on the screen together with markings corresponding to those on the crane. It is the crane operator's responsibility to move the grab bucket so that its actual position is always within the marked range.

DE-PS No. 26 42 181 describes a device for displaying the position of the grab bucket on a display which is divided into a multiplicity of fields each containing two light-emitting diodes. One of the two light-emitting diodes is always driven by a set or desired-value transmitter and the other light-emitting diode by an actual-value transmitter, so that the desired and actual positions of the grab bucket are each represented by a light spot travelling across the display as the grab bucket moves. To initiate a loading or unloading process, the crane operator places the grab bucket on the bulk material through manual control and aligns a scaled template which corresponds to the cross section of a ship's hold on the display screen in accordance with the displayed actual position of the grab bucket. This enables the crane operator to set the desired values required for operation of the grab bucket within the template. The respectively set initial desired values are retained for several grabbing cycles as controlled by a marking-line computer. However, the operating range of the grab bucket cannot be determined with sufficient accuracy by approaching a target position only once and aligning the template on the display screen in dependence thereon to insure that collisions of the grab bucket with edges of the ship's hatches do not occur.

OBJECTS AND SUMMARY OF THE INVENTION

It is an object of the present invention to control a grabbing crane so as to avoid collisions of the grab bucket with the enclosure it is loading or unloading.

It is another object of the present invention to display a permissible operating range of the grab bucket to scale on a display.

According to the invention, the upper edges of the enclosure, e.g. the hatch of a ship's hold, are displayed as bars on a display. The invention will hereinafter be described with reference to a ship's hold and its hatch. The bars are generated from actual horizontal and vertical positions of the grab bucket. The actual values corresponding to those positions are determined by positioning the grab bucket at the hatch edges after approaching the hatch edges of the ship from the shore and water sides with the grab bucket open. Desired values corresponding to the desired position of the grab bucket are compared with the actual values which are used as limiting values. If a desired value exceeds a limiting actual value, the respective drive is prevented from moving the grab bucket to the precise desired location.

A desired path of the bucket derived from a marking line computer for example can be compared with the actual values. If the desired path indicates a collision, i.e. it intersects with any of the actual values, the respective drive is prevented from moving the bucket along the collision path.

The image of the grab bucket can be displayed to scale and corresponding to its actual position. A scale image of the hold, desired values and actual values in digital form, and a desired path can also be displayed.

The above and other objects, aspects, features and advantages of the invention will be more apparent from the following description of the preferred embodiments of the invention taken in conjunction with the accompanying drawings and appended claims.

BRIEF DESCRIPTION OF THE DRAWINGS

The present invention is illustrated by way of examples and not limitation in the FIGURE of the accompanying drawing which is a schematic diagram of an arrangement for controlling the operation of a grabbing crane according to the invention.

DESCRIPTION OF THE PREFERRED EMBODIMENTS

The arrangement according to the invention for controlling the operation of a grabbing crane includes pickups 1 and 2 which provide information of the horizontal and vertical position of the grab bucket. This information of the actual position of the grab bucket is used to provide values corresponding to limiting horizontal and vertical positions of the grab bucket by visually locating the grab bucket at the extremes of the hatch of the hold it is loading or unloading. The values derived from the pickups at those extremes are denoted limiting actual values. The limiting actual values are compared with the values of a desired grab bucket position. When a desired value exceeds a limiting actual value, the corresponding drive to the crane is overrode or controlled via its drive control 22 and/or 23.

More specifically, the output of a pickup 1 coupled to the horizontal drive of the trolley carriage of a loading bridge (not shown) is fed as the actual value of the trolley carriage horizontal position directly to a receiver 7 which includes a display such as a cathode ray tube. The pickup output is also fed to the drive control 22 for the carriage and is set into an actual-value memory 5 via a key 3. In a similar manner, the output signal of a pickup 2 coupled to the vertical drive of the grab bucket, i.e. the drive for the lifting and holding mechanism for the bucket, is fed directly to the receiver 7 and to a drive control 23 for the holding mechanism. The output of pickup 2 is further set into an actual-value memory 6 via a key 4.

The output of each actual-value memory is connected to a different actual-value input of the receiver 7 and to a common first comparator 21. The output of each actual value memory is also connected to a respective second comparator 16, 19. The comparators 16 and 19 compare the stored actual values of the trolley carriage horizontal position and the stored actual values of the grab bucket vertical position, respectively, with the counts of respective desired-value counters 14 and 17.

Both desired-value counters are connected to and receive desired values from a desired-value transmitter 13 which can be operated manually, or if desired, by a control mechanism to input the desired values to the counters. With each desired-value counter 14, 17 is further associated a desired-value memory 15, 18, respectively, the output signal of which is fed to the receiver 7 and, in dependence upon the output signal of the comparator 16 or 19, to the respective drive control 22, 23.

By means of a selector switch 20, one of the marking lines stored in a marking-line computer is set into the common comparator 21. The output signal of this comparator acts directly on the drive controls 22 and 23.

The receiver 7 includes a digital display of the desired values 24, 25 and of the actual values 26, 27 of the horizontal position of the carriage and the vertical position of the grab bucket, respectively. The image 9 of the grab bucket is displayed on the display of the receiver 7 to scale, in its opened or closed configuration, and in accordance with its actual position. In addition, a scale image of the stationary hold 12 which is to be loaded or unloaded is displayed on the display of the receiver 7. Furthermore, a marking line 8 selected by the crane operator via selector 20 is displayed on the receiver. Two bars 10, 11 derived from stored actual values of the grab bucket position are also displayed on the receiver. The bars 10, 11 represent the upper edges of the hatch and correspond to the horizontal and vertical position of the hatch and its width.

To fix the permissible operating range of the grab bucket in the interior of the hold, the position of which relative to the loading bridge is unknown and can change, the grab bucket is controlled manually by the crane operator such that it is brought in its opened configuration as close as possible to the edge of the hatch first on the shore side and then on the water side of the ship. The actual values of the carriage horizontal travel and the holding mechanism vertical travel corresponding to these two approach positions of the grab bucket are set into the actual value memories 5 and 6, respectively, by operation of the keys 3 and 4 by the crane operator. The bars 10 and 11 corresponding to the approach positions are displayed on the receiver display in accordance with the output signals of the actual-value memories, thereby indicating the permissible operating range of the grab bucket. Within the operating range fixed by the bars, the crane operator can select any desired point by setting a desired value, for example from the desired value transmitter 13, accordingly. The counts of the desired-value counters 14, 17 set by the desired-value transmitter 13 are compared in the comparators 16, 17, respectively, with the actual values set into the actual-value memories 5, 6, respectively. If any desired value set by the crane operator exceeds a stored actual value, then the respective comparator blocks transmission of the portion of the desired value exceeding the actual value from the desired-value memory to the respective drive control.

If the crane operator preselects by means of the selector switch 20, a marking line from a marking line computer which intersects, for instance, one of the two bars 10 and 11 on the display, thus indicating the possibility of a collision of the grab bucket with a hatch edge, the output signal of the comparator 21 obtained from a comparison between the desired values corresponding to the marking line with the actual values stored in the memories 5 and 6 causes the two drive controls 22 and 23 to interrupt movement of the grab bucket.

In automatic operation, a control mechanism advantageously takes over the control of the carriage and holding mechanism drives and the opening and closing of the grab bucket. Except for selection of the marking lines, fully automatic operation of the device is thereby possible.

Pendulum oscillations of the grab bucket are damped or suppressed by means known to those of skill in the art.

The pickups, comparators, memories, counters, drive controls, and the desired value transmitter are per se conventional and known to those of skill in the art. Marking line computers and receiver/displays are also per se conventional and known to those of skill in the art.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of disclosure without departing from the spirit and scope of the invention.

What is claimed is:

1. An arrangement for controlling the operating of a bulk material grabbing crane having a grab bucket, comprising a display, an actual value memory for storing limiting values corresponding to the upper edges of an enclosure into and from which bulk material is loaded and unloaded, means coupled to the display for causing two spaced bars corresponding to the upper edges of the enclosure to be displayed on the display in accordance with the values stored in the actual value memory, means coupled to the display for causing an image of the grab bucket to be displayed on the display in accordance with the actual position of the grab bucket, a desired value memory for storing values corresponding to desired locations of the grab bucket, means for setting the desired values into the desired value memory, and means for comparing the limiting actual values stored in the actual value memory and the desired values stored in desired value memory and providing an output indicative of the comparison.

2. The arrangement according to claim 1 and including means coupling said output to a drive for the crane to prevent the bucket from being moved to a desired position if a desired value exceeds a corresponding limiting actual value.

3. The arrangement according to claim 1 or 2 wherein the means for setting the actual values comprises a device for manually setting the actual values in the actual value memory in accordance with actual positions of the grab bucket.

4. The arrangement according to claim 1 and including means for setting a desired path of the bucket relative to the enclosure, means for comparing values of the desired path with the actual values stored in the actual value memory, and means for coupling the result of the comparison to a drive of the crane.

5. The arrangement according to claim 4 and including means for displaying on the display a marking line.

6. The arrangement according to claim 1 and including means for digitally displaying the desired values and actual values set into the respective memories on the display.

7. The arrangement according to claim 1 and including means for displaying to scale an image of the bucket on the display in accordance with its actual position.

8. The arrangement according to claim 1 and including means for displaying to scale on the display an image of the enclosure.

* * * * *